United States Patent [19]
Sharp et al.

[11] 3,777,462
[45] Dec. 11, 1973

[54] FRUIT HARVESTER
[76] Inventors: James G. Sharp; David E. Sharp, both of JI-Meva Farm, North Rose, N.Y.
[22] Filed: Mar. 17, 1972
[21] Appl. No.: 235,524

[52] U.S. Cl. ............................................... 56/328
[51] Int. Cl. .......................................... A01g 19/00
[58] Field of Search ...................... 56/328, 28, 364; 214/353-356; 15/2 R, 78, 82, 83

[56] References Cited
UNITED STATES PATENTS

| | | | |
|---|---|---|---|
| 3,049,129 | 8/1962 | Mark et al. ............................ | 130/26 |
| 2,037,624 | 4/1936 | Franklin ................................ | 56/330 |
| 2,355,273 | 8/1944 | Case ..................................... | 56/330 |
| 2,508,401 | 5/1950 | Kirk ...................................... | 56/130 |
| 3,621,643 | 11/1971 | Gerrans ................................ | 56/329 |
| 3,475,889 | 11/1969 | Overstreet ........................... | 56/328 R |
| 3,530,655 | 9/1970 | Whitney ............................... | 56/328 R |
| 3,591,948 | 7/1971 | Brumbaugh et al ................. | 56/328 R |
| 3,295,302 | 1/1967 | Lee ....................................... | 56/364 |
| 3,595,363 | 7/1971 | Vinyard ............................... | 56/364 X |
| 3,657,869 | 4/1972 | Ayranto ............................... | 56/294 |

FOREIGN PATENTS OR APPLICATIONS

1,430,313  1/1966  France ............................ 56/328 R

*Primary Examiner*—Russell R. Kinsey
*Attorney*—Charles S. McGuire

[57] ABSTRACT

A harvesting machine for picking up fruit, such as apples, which has fallen to the ground and placing it in a box or other suitable container. A drive shaft is concentrically disposed within an elongated shield of uniform, substantially semi-circular cross section. The shaft carries and imparts rotation to a plurality of blade assemblies arranged in closely spaced relation axially along the shaft, each assembly having a plurality of radially extending blades substantially tangential to the drive shaft. The fruit is picked up by the blades, carried around the shield, and propelled against a resilient curtain to drop onto conveying means without bounce or bruise and be transported to the container. Blower means are provided for separating grass, and the like, from the fruit as it is traveling between the blades and the curtain. Means are also provided for selectively tilting the container to avoid bruising the fruit as it is placed therein.

8 Claims, 8 Drawing Figures

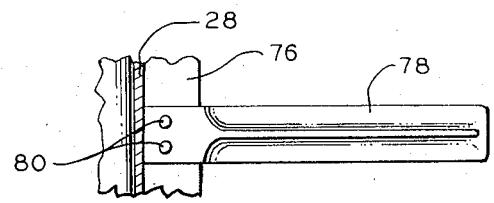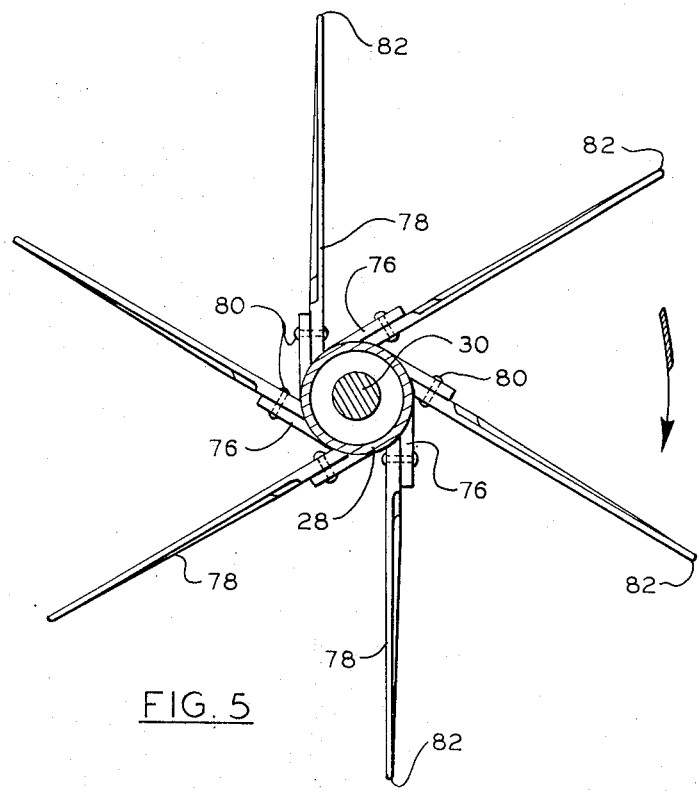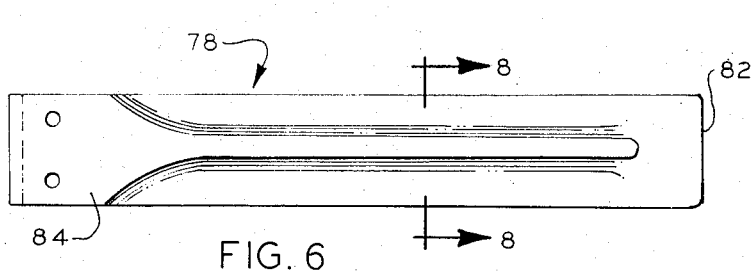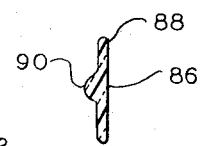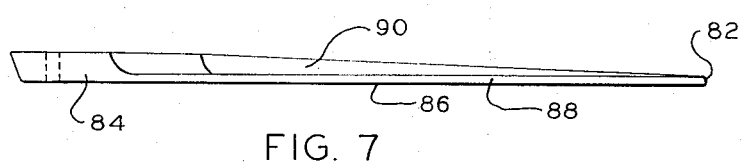

3,777,462

FRUIT HARVESTER

This invention relates to fruit harvesting machinery and, more particularly, to apparatus for picking up fruit which has fallen to the ground and placing it in a container as the machine is moved over the ground.

The prior art includes various forms of apparatus for picking up fallen fruit, amont which are machines for lifting the fruit with blades or paddles and carrying it to conveyor means which discharges into an appropriate container. It is common, however, for such apparatus to become clogged with grass, or other foreign material, as it is moved over the ground to pick up the fruit. Another common disadvantage of conventional harvesting apparatus of this type is that the fruit may be bruised or crushed as it is picked up, or transported through the apparatus, or discharged into the container.

In a general sense, the object of the present invention is to provide novel and improved harvesting apparatus which will pick up fruit from the ground and place it in a container in an efficient manner without damaging the fruit.

A further object is to provide a fruit harvesting machine having a plurality of blades rotatable close to the ground to pick up fruit and which does not easily become clogged with grass, or other such foreign material, picked up in the course of harvesting the fruit.

Still another object is to provide fruit harvesting apparatus having conveying means discharging into a container and having means for preventing damage to the fruit which would otherwise occur due to dropping it from the conveying means into the container.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

FIG. 4 is a plan view, as seen from the line 4—4 of FIG. 5, of one of the blade assemblies;

FIG. 5 is an elevational view of the blade assembly;

FIG. 6 is a plan view of an individual blade;

FIG. 7 is a side elevational view of the blade; and

FIG. 8 is a sectional view on line 8—8 of FIG. 6.

Figure 1:
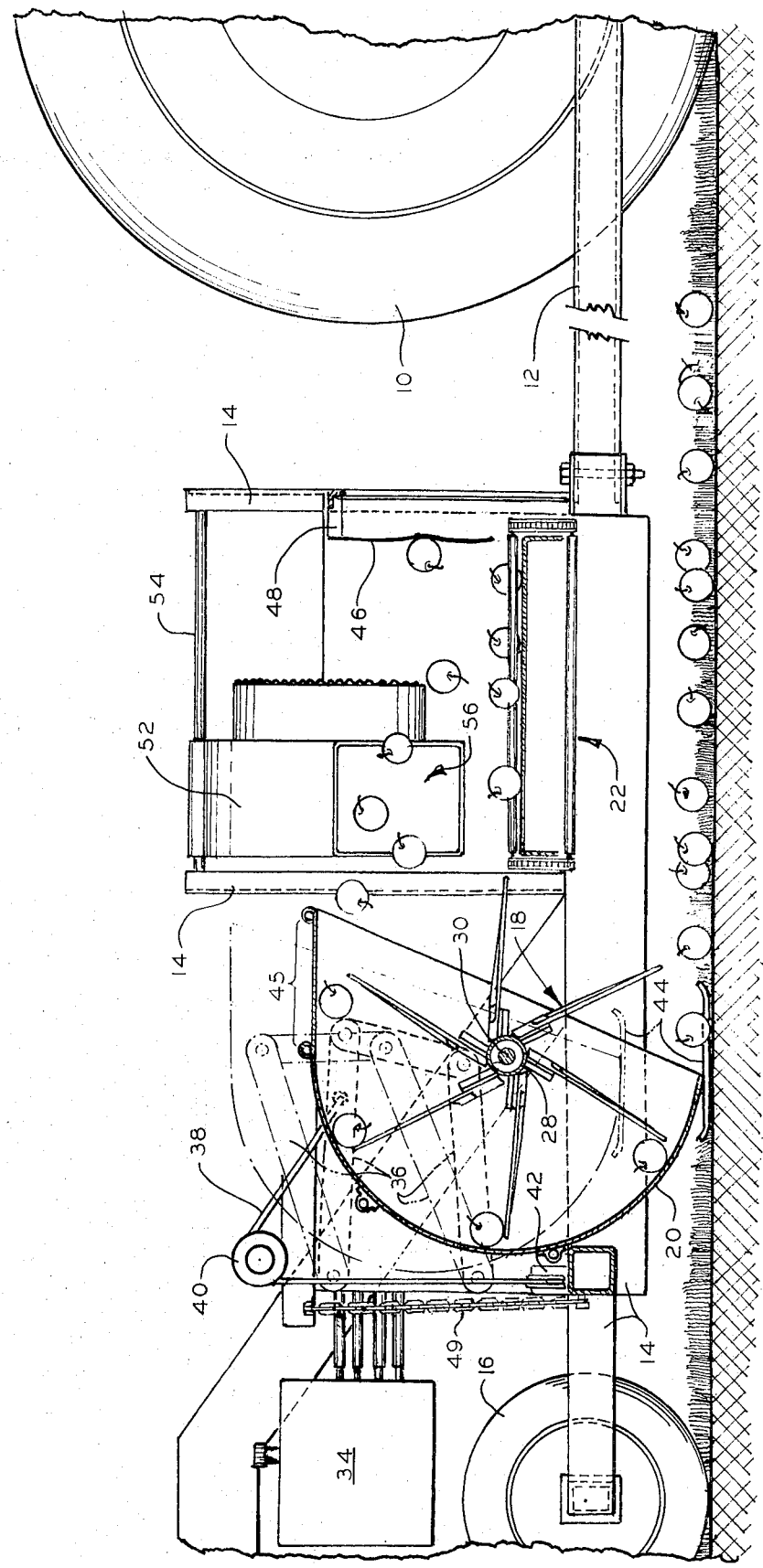
FIG. 1 is a fragmentary, side elevational view, partly in section on the line 1—1 of FIG. 2, of a preferred embodiment of the invention.

The apparatus of the invention is preferably moved by a separately powered vehicle, normally a tractor, as with other agricultural implements of a similar nature. Hydraulic motors used to drive various elements of the apparatus may be powered from the power take-off unit commonly provided on tractors, and the like. In FIG. 1 is shown a fragment of a wheel 10 and drawbar 12 of a tractor used to move the harvester apparatus, the operative connection between the tractor and harvester being entirely conventional.

Figure 2:
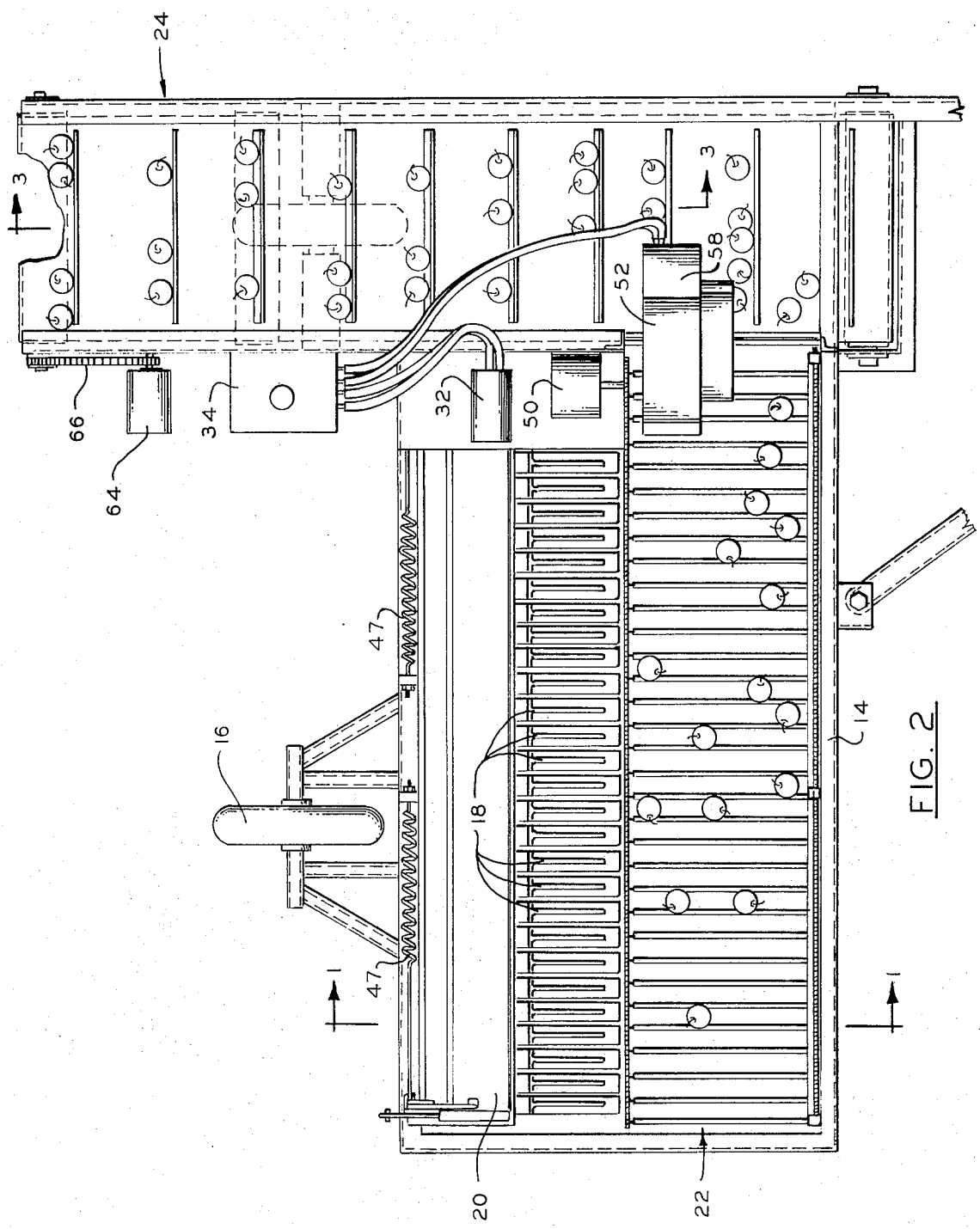
FIG. 2 is a plan view of the apparatus of FIG. 1.
Figure 3:
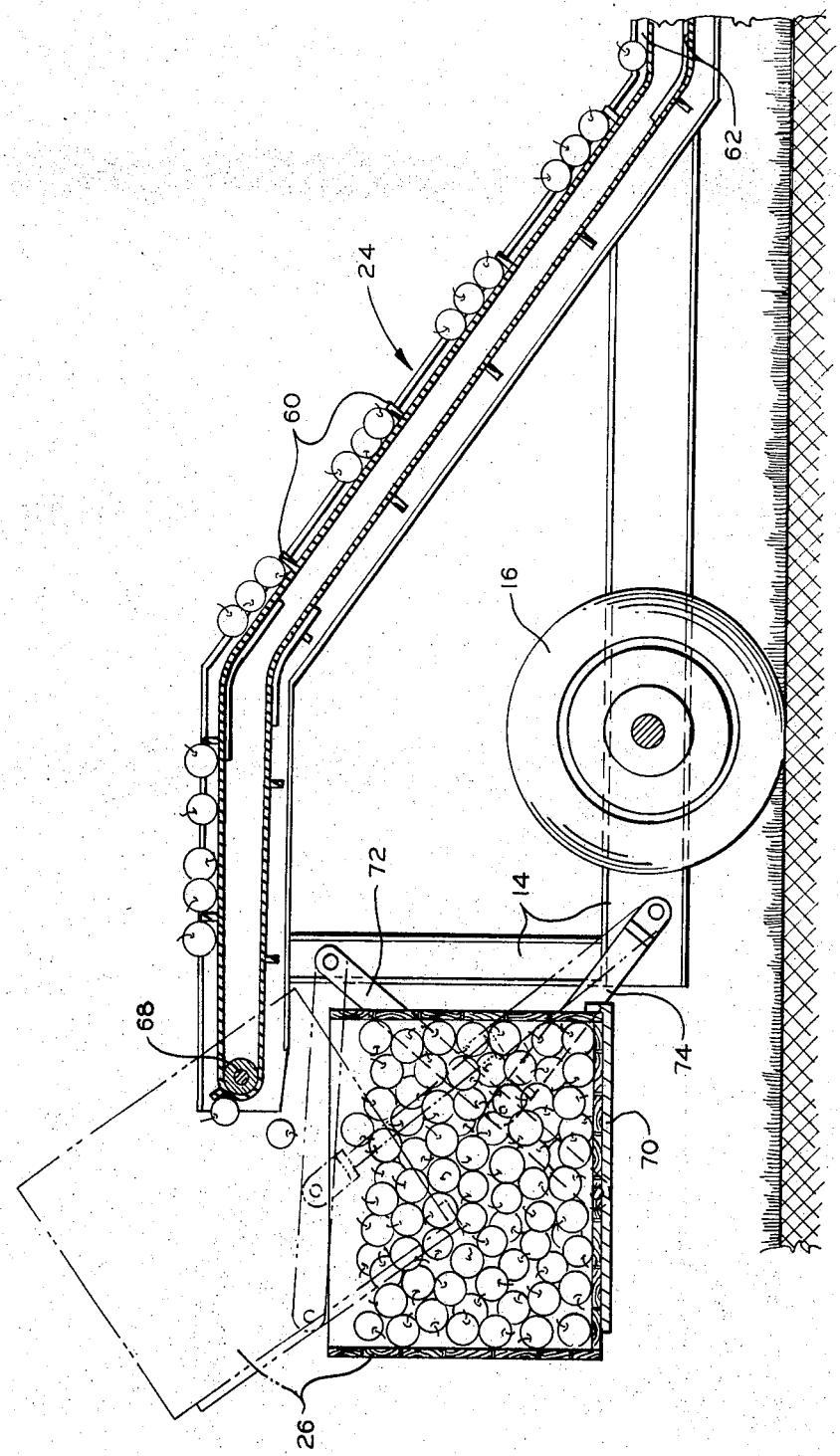
FIG. 3 is a side elevational view, in section on the line 3—3 of FIG. 2, of a portion of the apparatus, showing certain items in different positions of relative movement.

The overall construction and operation of the invention can best be seen by reference to FIGS. 1-3. The apparatus is disclosed as a harvesting machine for apples but, of course, may be used for picking up other fruits or vegetables which are lying on the ground. The reference numeral 14 is used to denote generally the structural members used to provide a rigid frame for the apparatus, which is mounted on wheels 16. The fruit is picked up from the ground by rotating blade assemblies 18, carried around the elongated, semi-circular shield 20, dropped on horizontally disposed conveyor 22, carried to inclined conveyor 24 and discharged into box 26. Blade assemblies 18, as seen in FIG. 2, are mounted in closely spaced relationship, so that no fruit can fall between the blades of adjacent assemblies. The blade assemblies, a more detailed description of which will be given later, are affixed to tubular member 28 which is concentrically mounted and fixedly attached with respect to central drive shaft 30 (FIG. 1). Hydraulic motor 32 (FIG. 2) is connected by appropriate fluid-carrying lines to hydraulic manifold 34 and imparts rotation to drive shaft 30, and thereby to blade assemblies 18.

Shield 20 extends around a portion of the periphery of the path followed by the ends of the blade assemblies. The front of the shield is open and the sides closed by appropriately shaped and secured end plates. Shield 20 is mounted on frame 14 by parallelogram linkages at each end, such as that indicated in FIG. 1 by reference numeral 36. The linkage has fixed pivots on the frame and movable pivots on the shield end plates.

Cable 38 is attached to the upper link of linkage 36 and passes around pulleys 40 and 42, as is a similar cable at the opposite end. The cables may be drawn up to raise the linkages, and thereby shield 20, from the positions shown in solid or hidden lines to those shown in dot-dash lines in FIG. 1. Drive shaft 30 is journalled in the end plates of shield 20, and motor 32 is fixedly mounted with respect to one end plate, whereby the blade assemblies and motor are moved along with the shield. These elements are secured in the upper, or inoperative position when the apparatus is being transported from one place to another and not being used to pick up fruit. At such times, of course, the hydraulic power units are shut off so that the operative parts may remain stationary. One or more skids, such as that indicated by reference numeral 44, are attached to the lower edge of shield 20 at each end or at other appropriate intervals, so that the bottom of the shield will follow the ground contour closely. It will be noted from FIG. 1 that, while the laterally extending portion of the shield has been characterized as semi-circular in cross section, horizontal portion 45 extends forwardly, tangent to the upper edge of the semi-circular portion and integral therewith. This provides sufficient support areas on the end plates for drive shaft 30 and insures that fruit will be propelled at or below the horizontal. Cables 38 are attached to springs 47 (FIG. 2) which are secured to a portion of the frame to absorb a major portion of the weight of shield 20, thereby reducing the ground load and allowing the shield to travel more easily. Chain 49 (FIG. 1) is provided as a retaining means for holding the shield in the upper position by inserting a link through an appropriate retainer affixed to the frame.

As previously mentioned, the space between the end of the blades and the inner surface of shield 20 is small, substantially less than the typical cross sectional dimension of the fruit to be harvested by the apparatus. Thus, as the tip of the blades pass the lowest point of their rotation, any fruit in their path will be engaged by the blade ends and pushed into shield 20. The blade assemblies rotate in a clockwise direction as seen in FIG. 1, whereby the blade ends are moving rearwardly at the lowest point and forwardly at the highest point of their travel with respect to the direction of movement of the apparatus.

Fruit picked up by the blades may travel somewhat up the blade toward the center of the blade assembly, but the speed of rotation is such that centrifugal force tend to keep the fruit at or near the blade ends. The fruit cannot fall off the blade end while inside shield 20 due to the close spacing of the blade ends and shield. As the blades pass the top of their travel the fruit will be propelled forwardly thereby. The speed of blade rotation is preferably so related to the forward speed of the apparatus that there is relative rearward motion of the blade ends with respect to the ground as the blades pass their lowest point of travel. That is, the velocity of the blade ends is slightly greater than the forward velocity of the apparatus.

The fruit travels forwardly after leaving the blades until it either drops on horizontal conveyor 22 or strikes resilient curtain 46, preferably of canvas or other heavy fabric, which is suspended freely from spacer 48. The fruit may strike curtain 46 at a quite high velocity without damage to the fruit due to the curtain's resiliency. Conveyor 22 is not described in detail, being conventional in nature and powered by hydraulic motor 50. A belt, chain, or other conventional support may be used as the endless conveyor means, with the usual drive and idler rolls, and any other required support means.

Blower 52 is supported on rod 54, which extends between upstanding portions of frame 14, near the discharge end of conveyor 22. The blower construction is conventional, containing appropriate rotary fan blades which discharge an air stream through opening 56. The fan blades are powered by hydraulic motor 58. The lateral position of blower 52 may be adjusted along rod 54 as desired. The positioning of the blower adjacent the end of the row of blade assemblies directs the air stream down the path of the discharge of the blades, thereby carrying away grass, leaves, twigs and other light foreign matter which is picked up along with the fruit.

Conveyor 24 includes a lower horizontal portion, a central inclined portion, and an upper horizontal portion, as best seen in FIG. 3. The lower horizontal portion is disposed below the discharge end of conveyor 22, whereby the fruit is transferred from one conveyor to the other. The fruit is then elevated by the inclined portion of conveyor 24, being retained thereon by lugs 60. The directional changes of conveyor 24 are effected by fixed guide plates 62 at the edges of the conveyor belt, outside lugs 60. Conveyor 24 is powered by hydraulic motor 64, connected by chain 66 to drive roll 68.

The fruit is discharged off the upper end of conveyor 24 into box 26. The box is supported on platform 70 which in turn is supported on each side between a pair of links, one of which is seen in FIG. 3 denoted by reference numeral 72. The links are pivotally connected to frame 14 at their other ends. Hydraulic actuator 74 is connected at its extensible end to a central portion of link 72 and pivoted at its fixed end to frame 14. When actuator 74 is extended, platform 70 and box 26 are pivoted about the upper end of link 72 to the positions shown in dot-dash lines in FIG. 3. The linkages and supports are shown somewhat diagrammatically for clarity and brevity, but any other required structure could easily be added to achieve the indicated movement. When box 26 is empty, actuator 74 is extended and the mhchanism is placed in the dot-dash line position so that box 26 is tilted under the discharge end of conveyor 24. Thus, the fruit has only a short distance to fall and is not crushed or bruised as it would be falling into an empty container in the lower position. As the container fills, it is gradually lowered by retraction of actuator 74. The lowering may be accomplished by fixed timing of the retraction of the actuator, by retracting in accordance with forward speed of the apparatus, or in accordance with the amount of fruit in the box by means of weight sensitive apparatus (not shown) attached to the linkage or actuator.

Turning now to FIGS. 4-8, the structure of the blade assemblies and individual blades is shown in greater detail. As previously stated, drive shaft 30 is fixedly connected by any convenient means (not shown) to tubular member 28. Welded, or otherwise affixed to the outer surface of member 28 are rigid, elongated, metal strips 76. In the illustrated embodiment, six such strips are provided, at uniform intervals around the tubular member, and extend substantially tangentially along the entire length thereof. Strips 76 serve as supports for individual blades 78 which are attached to each strip by rivets 80. Since blades 78 are attached to the side of strip 76 toward the center of member 28, the thickness of the blades and strips is such that the plane of the forward side of the blades is substantially tangent to drive shaft 30. The diameter of shaft 30 is preferably approximately equal to that of the typical fruit to be harvested by the apparatus, and the shaft is mounted on the axis of the semi-circle of the cross section of shield 20. This provides optimum performance since tips 82 of blades 78 will be closest to the ground when there is a space approximately equal to the thickness of one apple between the tip of the blade and the lower forward edge of shield 20. Although the blades may be mounted on the rearward sides of the strips, as shown in FIG. 1, with satisfactory operation, the FIG. 5 arrangement is preferred since greater support on the inner ends of the blades is provided by mounting them on the forward sides of the support strips.

Blades 78 are made of a somewhat flexible material, such as polyurethane plastic. A preferred example of the blade material is that supplied by Hysol Division of Dexter Corporation, Olean, New York, and designated by the manufacturer as Urethane Casting System Spc. TM-32. The blades are thickest at base portion 84, where the rivets are placed, and include flat surface 86 which faces in the direction of rotation of the blades, and therefore is the surface which engages the fruit. The major portion of the length of blades 78 is between square tip 82 and base portion 84, and comprises body portion 88 of substantially uniform cross section along its length from the base portion to the tip, and central rib 90. The thickness of body portion 88 is much less, e.g., less than one-half, that of base portion 84, and rib 90 gradually decreases from a combined thickness with the body portion equal to that of the base portion, to blend with body portion 88 somewhat short of tip 82.

The flexibility of blades 78, with the greatest amount of flexibility being in the region of the tip, provides distinct advantages in operation by reducing the tendency of the apparatus to become clogged or damaged from picking up foreign objects or materials. Although a limited amount of flexibility is provided by the construction and material of the blades, they are still stiff enough, of course, to pick up and propel the fruit in the manner indicated. The provision of blower 52 in the indicated arrangement also enhances operation by separating light foreign matter as the fruit is deposited on the first conveyor. The fruit is handled automatically and efficiently, yet in a manner which insures that minimal crushing or bruising will occur. The construction and arrangement of the various portions of the apparatus cooperate to provide efficient and reliable, yet simple and economical fruit harvesting apparatus.

While several embodiments of the invention have been illustrated and described, it is to be understood that the invention is not limited thereto. As various changes in the construction and arrangement may be made without departing from the spirit of the invnetion, as will be apparent to those skilled in the art, reference will be had to the appended claims for a definition of the limits of the invention.

What is claimed is:

1. Harvesting apparatus for picking up and collecting fruit lying on the ground, said apparatus comprising,
   a. frame means supported on wheels for movement over the ground in a forward direction to pick up fruit;
   b. an elongated shield extending transversely of said forward direction, having a substantially semi-circular cross section and supported by said frame means with one edge in close proximity to the ground and the open side disposed in said forward direction;
   c. a rotatable support member extending longitudinally and centrally of said shield;
   d. a plurality of rotary blade assemblies connected to said support member and extending from an anchored end to a free tip portion which passes in close proximity to the ground at the lower end of blade rotation to engage fruit thereon;
   e. means for rotating said support member, and thereby said blades, in a direction such that said tip portions are moving rearwardly when at the point of closest proximity to the ground; and
   f. conveyor means extending transversely of said forward direction and supported by said frame means forwardly of said shield to receive fruit propelled in said forward direction by said blade assemblies at the uppermost point in the travel of said tip portions.

2. The invention according to claim 1 and further including a curtain of flexible material arranged substantially vertically to extend upwardly from said conveyor along the forward side thereof, whereby fruit propelled forwardly by said blades which would otherwise pass over said conveyor strikes said curtain and falls onto the conveyor.

3. The invention according to claim 2 wherein said flexible material is a woven fabric.

4. The invention according to claim 1 wherein said means for rotating said support member is so related to the speed of movement of said frame means over the ground that the speed of said tip portions is greater than the forward speed of said frame means.

5. A pick-up head for incorporation in harvesting apparatus for picking up fruit and like crops, lying on the ground comprising:
   a. an elongated, tubular member;
   b. means for imparting rotation to said tubular member about its axis;
   c. a plurality of flexible blades having a fruit contacting surface, the plane of which forms a chord with respect to said tubular member parallel to and substantially spaced from a chord through the center thereof and trailing said central chord with respect to the direction of rotation of said tubular member.

6. The invention according to claim 5 wherein said blades extend from said tubular member with said fruit contacting surfaces in a plurality of planes spaced at even angular intervals about the axis thereof.

7. The invention according to claim 6 and further including a plurality of blade supports extending rigidly from, and substantially tangent to, the outer surface of said tubular member.

8. The invention according to claim 7 wherein said blades are affixed to said blade supports with the surface of said blades opposite said fruit contacting surface in engagement with said supports.

* * * * *